US010635657B1

(12) United States Patent
Prakash et al.

(10) Patent No.: US 10,635,657 B1
(45) Date of Patent: Apr. 28, 2020

(54) DATA TRANSFER AND RESOURCE MANAGEMENT SYSTEM

(71) Applicant: Capital One Services, LLC, McLean, VA (US)

(72) Inventors: Gurucharan Manadavadi Prakash, Frisco, TX (US); Madan Gumudavelly, Little Elm, TX (US); Naga Chintala, Frisco, TX (US); Naga Venkata Sriram Vadakattu, Frisco, TX (US); Abhijit Chitnis, Frisco, TX (US); Sarvani Maddina, Frisco, TX (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 0 days.

(21) Appl. No.: 16/515,728

(22) Filed: Jul. 18, 2019

(51) Int. Cl.
*G06F 17/30* (2006.01)
*G06F 16/23* (2019.01)
*G06F 21/60* (2013.01)
*G06F 16/21* (2019.01)
*G06F 16/22* (2019.01)

(52) U.S. Cl.
CPC ........ *G06F 16/2365* (2019.01); *G06F 16/212* (2019.01); *G06F 16/2282* (2019.01); *G06F 21/602* (2013.01)

(58) Field of Classification Search
None
See application file for complete search history.

(56) References Cited

U.S. PATENT DOCUMENTS

| 9,582,541 | B2 | 2/2017 | Sareen et al. | |
|---|---|---|---|---|
| 9,946,593 | B2 | 4/2018 | Bishop et al. | |
| 10,205,735 | B2 | 2/2019 | Apostolopoulos | |
| 2008/0027913 | A1* | 1/2008 | Chang | G06F 16/00 |
| 2013/0281063 | A1* | 10/2013 | Jactat | H04W 24/08 455/411 |
| 2014/0201194 | A1* | 7/2014 | Reddy | G06F 16/248 707/722 |
| 2015/0244664 | A1* | 8/2015 | Kendal | H04L 51/14 709/206 |
| 2018/0027006 | A1 | 1/2018 | Zimmermann et al. | |
| 2018/0067732 | A1 | 3/2018 | Seetharaman et al. | |
| 2018/0295109 | A1* | 10/2018 | Wang | H04L 63/0442 |
| 2019/0103978 | A1* | 4/2019 | Chen | H04L 9/3247 |

* cited by examiner

*Primary Examiner* — Alex Gofman
(74) *Attorney, Agent, or Firm* — Sterne, Kessler, Goldstein and Fox P.L.L.C.

(57) ABSTRACT

Disclosed herein are system, method, and computer program product embodiments for a data transfer and resource management system. An embodiment operates by retrieving both data and a schema from a table. A first offset corresponding to the retrieved data indicating a retrieval time of the retrieved data and a number of records is identified. It is determined that the retrieved data corresponds to the schema. The data is stored on a messaging platform and made available to one or more end users prior to a transfer to one or more cloud servers. A second offset corresponding to a number of records of the data retrieved by the one or more end users from the messaging platform is determined. It is validate that the second offset corresponds to the first offset. The records and the schema retrieved from the intermediary messaging platform are transferred to the one or more cloud servers.

17 Claims, 3 Drawing Sheets

DATA TRANSFER AND RESOURCE MANAGEMENT SYSTEM

BACKGROUND

Moving or copying data between two different data storage locations often requires large amounts of memory, processing power, and bandwidth. When problems are discovered within a portion of the moved or copied data, this often requires all of the resources to be reallocated to move all of the data again to resolve the error. This is an inefficient approach that causes system delays and unnecessary bandwidth and resource consumption.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, apparatus, device, method and/or computer program product embodiments, and/or combinations and sub-combinations thereof, for providing a data transfer and resource management system.

Figure 1:
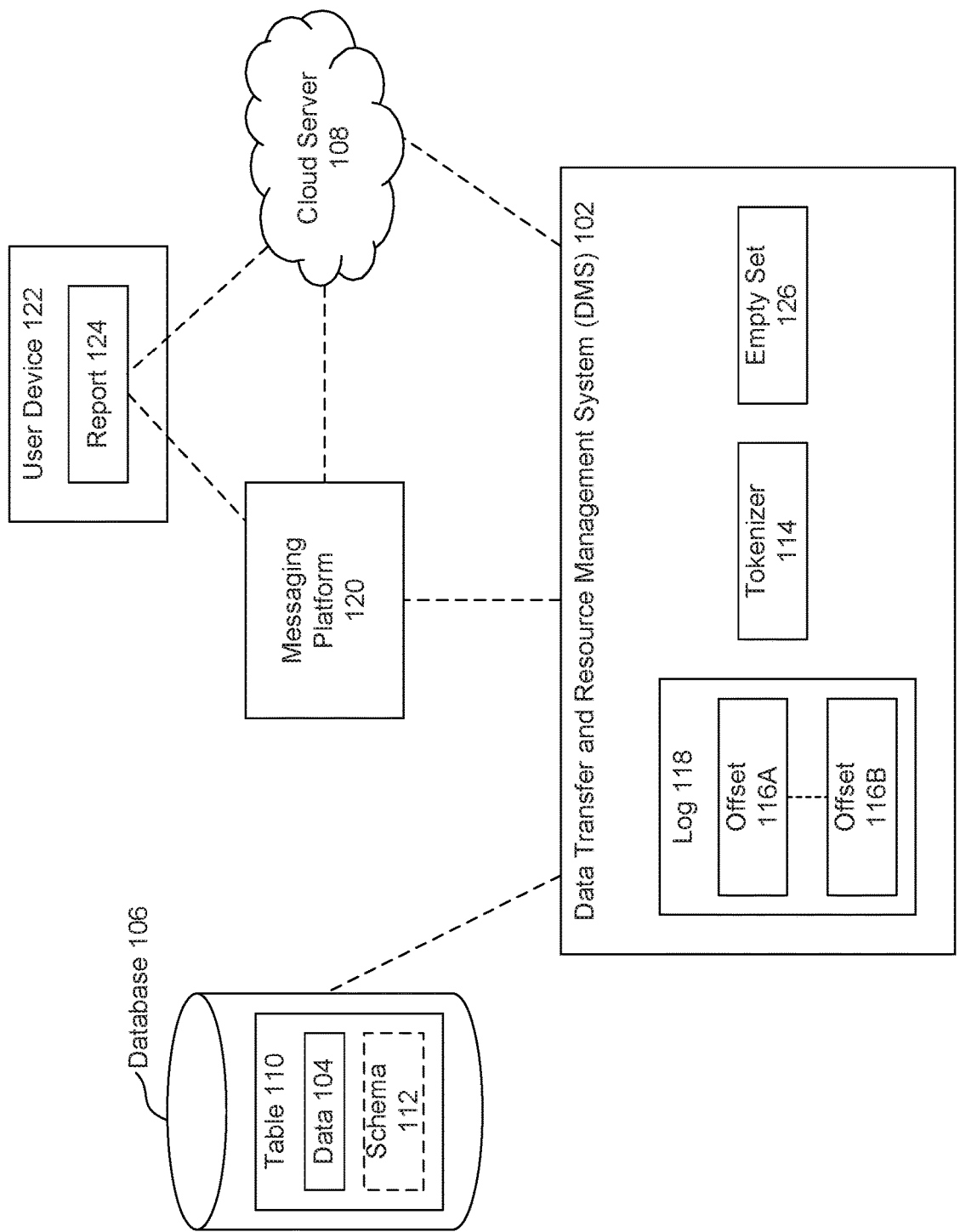
FIG. 1 is a block diagram illustrating example functionality for providing a data transfer and resource management system (DMS), according to some embodiments.

FIG. 1 is a block diagram 100 illustrating example functionality for providing a data transfer and resource management system (DMS) 102, according to some embodiments. In the example of FIG. 1 data 104 may be moved or copied from a database 106 to a cloud server 108.

Database 106 may be any data storage or data organization location and may include a set of files or data records distributed across one or more servers or other computing devices. Database 106 may include a row-oriented or column-oriented database. Database 106 may include a relational database, such as an Oracle, Postgres, SQL Server, and NoSQL database. Cloud server 108 may include one or more servers or other computing devices that operate together as a cloud computing system. While cloud computing is the primary example described herein, it understood that in other embodiments, cloud server 108 may include another destination database organized across one or more computing devices that are not organized in a cloud computing structure.

Data 104 may be any data that is stored or organized in a table 110 of database 106. The table 110 may include either column-oriented and/or row-oriented tables, and may have its own schema 112. Schema 112 may include information about the table, columns, and rows of table 110. For example, schema 112 may include what types of data are stored in the various columns of table 110, the expected or required format of the data 104, column names, and other metadata information. As will be described in greater detail below, DMS 102 may use schema 112 information as a data validation or integrity check in the process of moving or copying data from database 106 to cloud server 108.

DMS 102 may manage the data transfers, movement, or copying between database 106 and cloud server 108, and may minimize resource usage in data transfers and re-transfers. When data 104 needs to be moved or copied from database 106 to cloud server 108, DMS 102 may pull, copy, or retrieve the data 104 from database 106 to be transferred. However, rather than just moving data 104, DMS 102 may also extract and record schema 112 information as well. Schema 112 may be extracted and stored using, for example, a data dictionary API. As used herein, the terms data transfer, movement, and copying are all used interchangeably.

To provide additional security, DMS 102 may encrypt or tokenize any sensitive data copied from database 106. For example, based on schema 112, DMS 102 may identify any columns of data that have been marked as including sensitive information. A tokenizer 114 may then tokenize or encrypt the sensitive data prior to or in the process of movement.

For example, DMS 102 may determine that a social security number column includes sensitive information. In an embodiment, tokenizer 114 may extract the sensitive data values from the social security number column of the copied data, encrypt the extracted data, and then replace the original data values with the encrypted data values. DMS 102 may then copy data 104 which includes some encrypted data values and some unencrypted data values from database 106 to cloud server 108 as described herein. In an embodiment, original social security number data values may remain in their unencrypted form on database 106, while only the copy of the data 104 is encrypted.

In an embodiment, DMS 102 may use schema 112 to perform a data quality check on data 104 copied from database 106 to ensure the data 104 meets a set of data standards. In the data quality check, DMS 102 may confirm whether the data values copied from database 106 conform to the expected values or data types for at least a selection of columns or rows from schema 112. For example, schema 112 may indicate that an integer is expected for column 3 of Table 1. Then, DMS 102 may check some or all of the values of column 3 to ensure integer values exist in the copied data 104. If a non-integer value is identified within the column data, such as a String, Boolean, or Real value, then the data quality check may fail, and the data 104 may be copied again.

In copying or retrieving data 104 from database 106, DMS 102 may record a first offset 116A in a log 118. Log 118 may be a data log that stores offset information for data movements to and/or from database 106, cloud server 108, and a messaging platform 120. Log 118 may use, for example, a keystore-style API for offset management, and may be streamed real time to a dashboard to help monitor the health of the process, using, for example, a log aggregation API. Offset 116A may include a date and time of the data pull or retrieval and a number of records and/or a tracking of which records from which table(s) 110 are copied into the dataset (e.g., data 104). In an embodiment, different numbers of records may be copied from different tables 110, and these records may be identified and recorded as part of offset 116A in log 118. The copied data 104 may or may not include contiguous rows of data copied from one or more tables 110 of database 106.

After copying data 104 from database 106, the copied data 104 may be made available or pushed to a messaging platform 120 (which may be done after the data quality check, tokenization, and/or the offset 116A is logged). In an example embodiment, messaging platform 120 may provide a unified, high-throughput, low-latency platform for handling real-time data feeds. Messaging platform 120 may operate as a scalable publish and subscription message queue designed as a distributed transaction log. For example, messaging platform 120 may receive data 104 (including any encrypted data) and make that data available to one or more user accounts or user devices 122 which may be subscribed to data updates for data 104. An example messaging platform 120 may include a platform similar to Apache KAFKA.

As just noted, pushing, copying, or moving data 104 from database 106 to messaging platform 120 may make the data 104 available to one or more end users operating user devices 122 connected or subscribed to messaging platform 120. By utilizing messaging platform 120, DMS 102 may increase overall system throughput by making data available more quickly to users who would otherwise have to wait until data 104 is uploaded to cloud servers 108 which may be a more time consuming and/or resource intensive process relative to moving data to messaging platform 120.

While data 104 is available via messaging platform 120, DMS 102 may simultaneously or in parallel upload or make data 104 available for upload to cloud server 108. Once data 104 has been uploaded to cloud server 108 and is available to user accounts or user devices 122, the data 104 may no longer be made available through messaging platform 120.

In an embodiment, DMS 102 may track or receive from messaging platform 120 an indication as to which user accounts or user devices 122 retrieve which portions of data 104 from messaging platform 120, which may include any subscription or one-off request information. DMS 102 may also track and receive an indication as to which data 104 is retrieved from cloud servers 108 from various user accounts or user devices 122.

This tracking information about which user accounts or user devices 122 access, copy, receive, or retrieve data from messaging platform 120 and/or cloud server 108 may be stored as one or more second offsets 116B. Second offset 116B may indicate which data records, how many data records, and the date/time of when the data records (of data 104) were pulled from messaging platform 120 and/or cloud server to one or more user devices 122.

In an embodiment, DMS 102 may use second offset 116B to ensure that a user device 122 received or retrieved a full or accurate data set. For example, DMS 102 may compare first offset 116A to second offset 116B to ensure that the number of records moved from messaging platform 120 to user device 122 are the same. That is, DMS 102 may ensure that the same number of records that were initially pulled from database 106 as recorded in offset 116A matches the number of records pulled from messaging service 120, pushed to cloud server 108, and/or are pulled from cloud server 108. If the numbers do not match, the pulled data may be discarded, and a new set of data 104 may be re-retrieved or pulled from database 106 and/or pushed to a user device 122 over messaging platform 120 or cloud server 108.

In an embodiment, the data transfer between database 106 and cloud server 108 may occur on a regular time interval (e.g., hourly, daily, weekly, monthly, etc.). For example, data 104 may be pulled from database 106 every day at 12:01 am from May 1-May 29. However, it may be discovered on May 30$^{th}$ that the data for May 15$^{th}$ that was retrieved from cloud sever 108 or messaging platform 120 is incorrect or corrupted.

Rather than requiring all of the data for the entire timeframe (May 1-May 29) to be copied and moved again from database 106 to cloud server 108, which would consume a great deal of processing resources, memory, bandwidth, and time, DMS 102 enables a more narrow-ranged data pull or copy to be performed for the data within the affected time range. In an embodiment, DMS 102 may identify which data 104 was copied or moved from database 106 and/or retrieved by a particular user device 122 on May 15$^{th}$ based on offsets 116A, 116B. DMS 102 may then re-retrieve or push only that data 104 from May 15$^{th}$ and make that data available. For example, DMS 102 may copy the data 104 that was moved with a date value of being between May 15 at 0:00 and May 15 11:59 pm (since the time interval in the example was daily). In other embodiments, this time interval may vary.

In addition to making data 104 available to clients operating one or more user devices 122, DMS 102 may also make schema 112 information available to users of user devices 122. As noted above, schema 112 may include metadata information about data 104 such as table name, number of columns, data types for the columns, etc. By copying and making schema 112 information available to users or clients, DMS 102 provides end users with an advantage of better being able to understand the data 104 which they may be analyzing. This may be particularly helpful for any users who are unfamiliar with the data 104 and/or how it is organized within database 106.

In an embodiment, these users may create data reports 124. A data report 124 may include an aggregation, summary, or other tracking or statistical accounting of data 104 that is retrieved from database 106. For example, a data report 124 may utilize data 104 retrieved from table 110 that includes daily sales information (e.g., number of sales, returns, sales volume, profit, cost, date, client, location, etc.). The data report 124 may include a graph indicating daily sales volume and average sales volume for the previous 7 days.

The data report 124 may rely on the daily data transfers, copies, or data pulls that move new sales data 104 from table 110 and make data available via messaging platform 120 and/or cloud server 108. However, on a particular day no sales transactions may have occurred and thus no data 104 may have been generated or is available for copy or transfer to cloud server 108. As such, there may be no sales data for DMS 102 to pull from database 106.

Without data being uploaded to messaging platform 120 and/or cloud server 108, data report 12 may generate an error because data report 124 may be programmatically set to retrieve each day's data 104. When no data is available, data report 124 may interpret this as a technical failure and cause an error. As such, for those days when no new data has been added to table 110, there is no data for data report 124 to use and an error may be generated.

To avoid such data report errors, DMS 102 may determine when there is no new data to pull on a particular day or time frame and generate an empty set 126. Empty set 126 may be a DMS-generated or placeholder set of zero records that is used and made available to user devices 122 via messaging platform 120 and/or cloud server 108 to indicate there is no new data that was available for a particular timeframe (and avoid such data report errors). Empty set 126 may have only metadata in the file.

Otherwise, as just described, data report 124 may interpret that there was an error pulling data from database 106. In an embodiment, empty set 126 may include a meta-data only, zero record file with no data sets. In the example above, if on 12:01 am of a particular day DMS 102 determines that there no data to pull, DMS 102 may generate or otherwise make available empty set 126 to maintain data continuity.

System 100 thus allows automatic metadata management that allows for downstream data continuity and maintains data quality. Using offset management, targeted selections of data may be pulled at any time and real-time health of a given job may be monitored.

Figure 2:
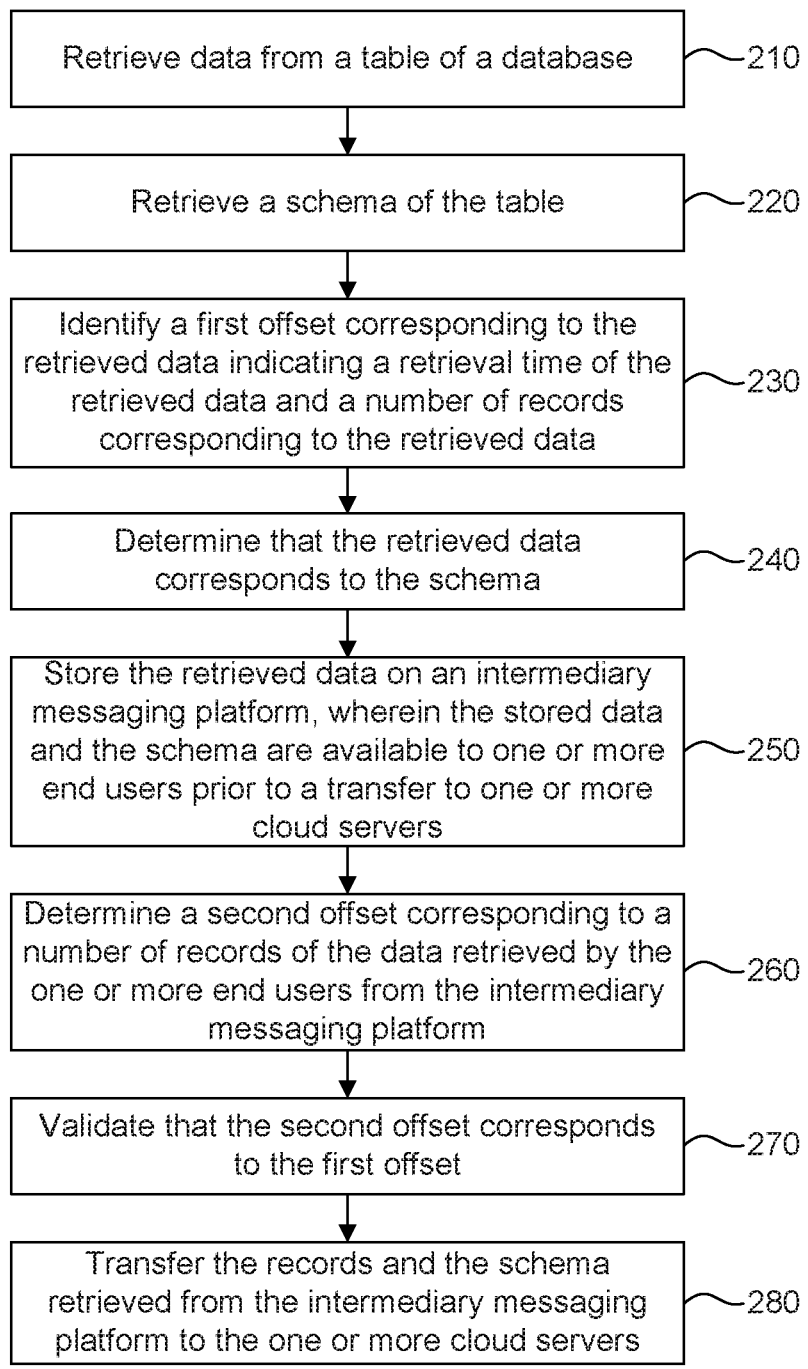
FIG. 2 is a flowchart illustrating example operations of a data transfer and resource management system (DMS), according to some embodiments.

FIG. 2 is a flowchart 200 illustrating example operations of a system for providing data transfer and resource management functionality, according to some embodiments. Method 200 can be performed by processing logic that can comprise hardware (e.g., circuitry, dedicated logic, programmable logic, microcode, etc.), software (e.g., instructions executing on a processing device), or a combination thereof. For example, various steps in method 200 may be performed using one or application programming interfaces (APIs) operating on one or more processing devices. It is to be appreciated that not all steps may be needed to perform the disclosure provided herein. Further, some of the steps may be performed simultaneously, or in a different order than shown in FIG. 2, as will be understood by a person of ordinary skill in the art. Method 200 shall be described with reference to FIG. 1. However, method 200 is not limited to the example embodiments.

In 210, data is retrieved from a table of a database. For example, DMS 102 may retrieve data 104 from database 106 as part of a requested or previously scheduled (including periodic, scheduled, or regular) data transfer operation to make data 104 available to user devices 122.

In 220, a schema of the table is retrieved. For example, in addition to retrieving data 104, DMS 102 may retrieve or copy a schema 112 or other metadata about the data 104 which may be available. This schema 112 information may be used to both perform data quality checks and provide users accessing the data 104 with greater information about the data by making schema 112 information available (thus making it easier and faster for them to generate data reports 124).

In 230, a first offset corresponding to the retrieved data indicating a retrieval time of the retrieved data and a number of records corresponding to the retrieved data is identified. For example, DMS 102 may record a date and time of data retrieval and a number of records copied from database 106 as offset 116A in log 118.

In 240, it is determined that the retrieved data corresponds to the schema. For example, DMS 102 may compare the retrieved records against the information retrieved from schema 112 to ensure that the copied data 104 corresponds to the expected data as indicated by schema 112. For example, if the schema indicates that the first column should be a date value and the fourth column should be a Boolean value, DMS 102 may perform a check on at least a subset of records to ensure the data types of the actual data values correspond to the schema 112 information. If the data check fails, data 104 may be re-retrieved from database 106.

In 250, the retrieved data is stored on an intermediary messaging platform, wherein the stored data and the schema are available to one or more end users prior to a transfer to one or more cloud servers. For example, DMS 102 may push or make available the copied data 104 to a messaging platform 120 so that users may begin accessing at least a portion of the data 104 more quickly relative to waiting for an entire data upload to complete to cloud server 108. In an embodiment, DMS 102 may simultaneously begin transferring data to cloud server 108. In another embodiment, DMS 102 may make data available on cloud server 108 without first making it available via messaging platform 120.

In 260, a second offset corresponding to a number of records of the data retrieved by the one or more end users from the intermediary messaging platform is determined. For example, DMS 102 may track which records of data 104 are accessed or which users or user accounts using user devices 122 access the data 104 from messaging platform 120 and/or cloud server 108. This information may be stored as a second offset 116B.

In 270, it is validated that the second offset corresponds to the first offset. For example, DMS 102 may compare offset 116A to offset 116B to ensure that the number of records for the data transfers aligns and the correct number of records were retrieved by, transferred to, or otherwise made accessible to a user device 122. If these numbers do not match, then the data 104 may be re-retrieved from database 106 and made available to user devices 122 over messaging platform 120 and/or cloud server 108.

In 280, the records and the schema retrieved from the intermediary messaging platform are transferred to the one or more cloud servers. For example, DMS 102 may transfer data 104 and schema 112 to one or more cloud servers 108.

Figure 3:
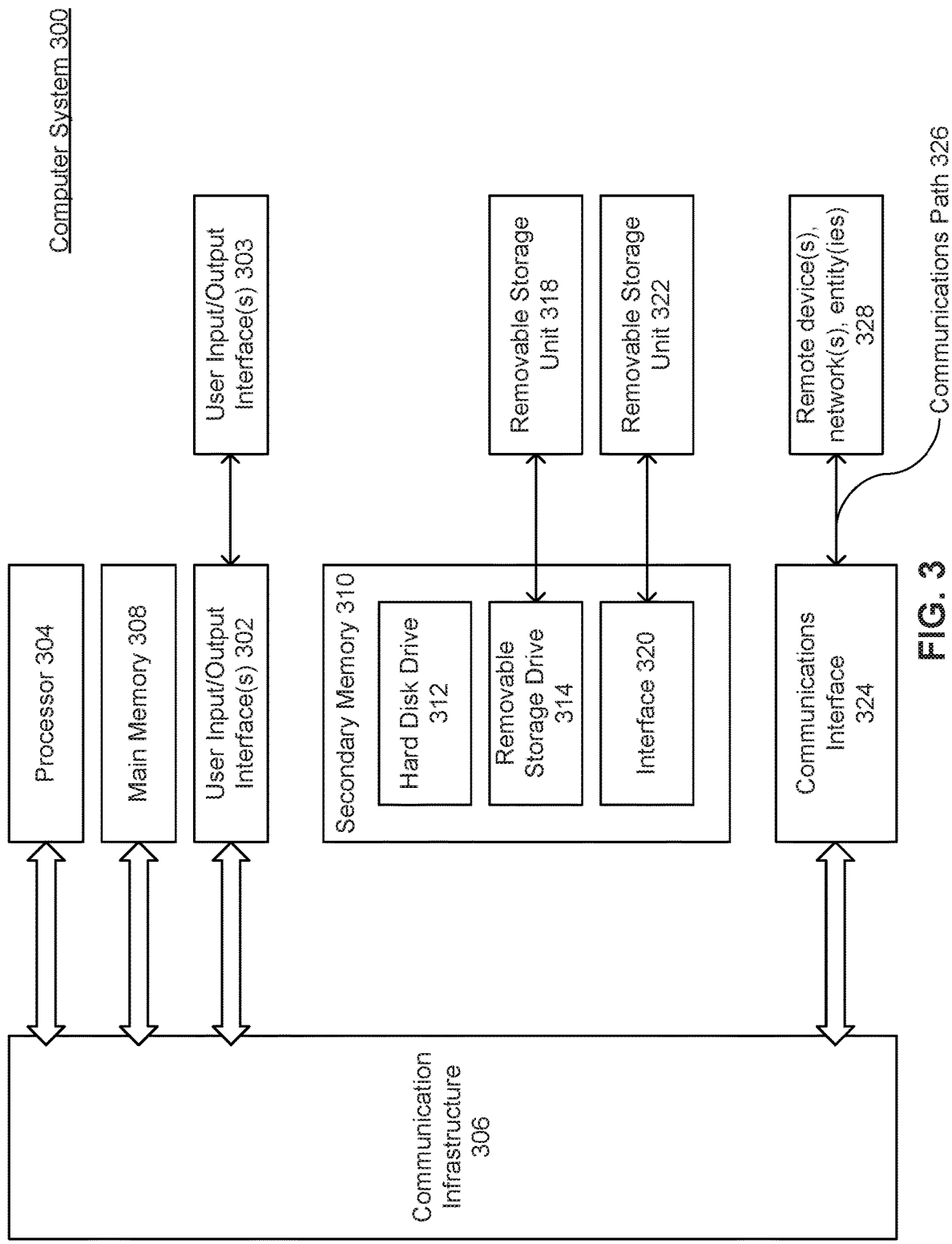
FIG. 3 is example computer system useful for implementing various embodiments.

Various embodiments may be implemented, for example, using one or more well-known computer systems, such as computer system 300 shown in FIG. 3. One or more computer systems 300 may be used, for example, to implement any of the embodiments discussed herein, as well as combinations and sub-combinations thereof.

Computer system 300 may include one or more processors (also called central processing units, or CPUs), such as a processor 304. Processor 304 may be connected to a communication infrastructure or bus 306.

Computer system 300 may also include customer input/output device(s) 303, such as monitors, keyboards, pointing devices, etc., which may communicate with communication infrastructure 306 through customer input/output interface(s) 302.

One or more of processors 304 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 300 may also include a main or primary memory 308, such as random access memory (RAM). Main memory 308 may include one or more levels of cache. Main memory 308 may have stored therein control logic (i.e., computer software) and/or data.

Computer system 300 may also include one or more secondary storage devices or memory 310. Secondary memory 310 may include, for example, a hard disk drive 312 and/or a removable storage device or drive 314. Removable storage drive 314 may be a floppy disk drive, a magnetic tape drive, a compact disk drive, an optical storage device, tape backup device, and/or any other storage device/drive.

Removable storage drive 314 may interact with a removable storage unit 318. Removable storage unit 318 may include a computer usable or readable storage device having stored thereon computer software (control logic) and/or data. Removable storage unit 318 may be a floppy disk, magnetic tape, compact disk, DVD, optical storage disk, and/any other computer data storage device. Removable storage drive 314 may read from and/or write to removable storage unit 318.

Secondary memory 310 may include other means, devices, components, instrumentalities or other approaches for allowing computer programs and/or other instructions and/or data to be accessed by computer system 300. Such means, devices, components, instrumentalities or other approaches may include, for example, a removable storage unit 322 and an interface 320. Examples of the removable storage unit 322 and the interface 320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 300 may further include a communication or network interface 324. Communication interface 324 may enable computer system 300 to communicate and interact with any combination of external devices, external networks, external entities, etc. (individually and collectively referenced by reference number 328). For example, communication interface 324 may allow computer system 300 to communicate with external or remote devices 328 over communications path 326, which may be wired and/or wireless (or a combination thereof), and which may include any combination of LANs, WANs, the Internet, etc. Control logic and/or data may be transmitted to and from computer system 300 via communication path 326.

Computer system 300 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 300 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 300 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 300, main memory 308, secondary memory 310, and removable storage units 318 and 322, as well as tangible articles of manufacture embodying any combination of the foregoing. Such control logic, when executed by one or more data processing devices (such as computer system 300), may cause such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 3. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method comprising:
retrieving data from a table of a database;
retrieving a schema of the table;
identifying a first offset corresponding to the retrieved data indicating a retrieval time of the retrieved data and a number of records corresponding to the retrieved data;
determining that the retrieved data corresponds to the schema;
storing the retrieved data on an intermediary messaging platform, wherein the stored data and the schema are available to one or more end users prior to a transfer to one or more cloud servers;
determining a second offset corresponding to a number of records of the data retrieved by the one or more end users from the intermediary messaging platform;
validating that the second offset corresponds to the first offset;
transferring the records and the schema retrieved from the intermediary messaging platform to the one or more cloud servers for different data sets retrieved from the table of the database;
determining that at least one of the transferred records of one of the data sets includes an error;
based on the retrieval time of the first offset, identifying which data set corresponds to the error; and
re-retrieving the identified data set identified based on the first offset, wherein at least one of the different data sets is not re-retrieved.

2. The method of claim 1, wherein the schema includes a table name, column names of a plurality of columns of the table, and data types for the plurality of columns of the table.

3. The method of claim 1, further comprising:
repeating the retrieving, identifying, determining that the retrieved data corresponds to the schema, storing, determining the second offset, validating, and transferring a plurality of times for different sets of data retrieved from the table of the database and transferred to the one more cloud servers.

4. The method of claim 1, further comprising:
identifying a plurality of sensitive data values retrieved from the table; and
encrypting the sensitive data values,
wherein storing the retrieved data comprises storing the encrypted sensitive values on the intermediary messaging platform.

5. The method of claim 1, further comprising storing both the first offset and the second offset in a log.

6. The method of claim 1, further comprising:
determining that the data is retrieved from the table on a regular time interval;
determining a report that is associated with the data retrieved from the table;
monitoring the retrieval of the data from the table during the regular time interval;
determining that there is no new data to retrieve from the table during a particular time interval; and
generating an empty data set for the report based on the determining that there is no new data.

7. A system comprising:
a memory; and
at least one processor coupled to the memory and configured to perform operations comprising:
retrieving data from a table of a database;
retrieving a schema of the table;
identifying a first offset corresponding to the retrieved data indicating a retrieval time of the retrieved data and a number of records corresponding to the retrieved data;
determining that the retrieved data corresponds to the schema;
storing the retrieved data on an intermediary messaging platform, wherein the stored data and the schema are available to one or more end users prior to a transfer to one or more cloud servers;
determining a second offset corresponding to a number of records of the data retrieved by the one or more end users from the intermediary messaging platform;
validating that the second offset corresponds to the first offset;
transferring the records and the schema retrieved from the intermediary messaging platform to the one or more cloud servers for different data sets retrieved from the table of the database;
determining that at least one of the transferred records of one of the data sets includes an error;
based on the retrieval time of the first offset, identifying which data set corresponds to the error; and
re-retrieving the identified data set identified based on the first offset, wherein at least one of the different data sets is not re-retrieved.

8. The system of claim 7, wherein the schema includes a table name, column names of a plurality of columns of the table, and data types for the plurality of columns of the table.

9. The system of claim 7, the operations further comprising:
repeating the retrieving, identifying, determining that the retrieved data corresponds to the schema, storing, determining the second offset, validating, and transferring a plurality of times for different sets of data retrieved from the table of the database and transferred to the one more cloud servers.

10. The system of claim 7, the operations further comprising:
identifying a plurality of sensitive data values retrieved from the table; and
encrypting the sensitive data values,
wherein the operations comprising storing the retrieved data further comprise storing the encrypted sensitive values on the intermediary messaging platform.

11. The system of claim 7, the operations further comprising storing the first offset and the second offset in a log.

12. The system of claim 7, the operations further comprising:
determining that the data is retrieved from the table on a regular time interval;
determining a report that is associated with the data retrieved from the table;
monitoring the retrieval of the data from the table during the regular time interval;
determining that there is no new data to retrieve from the table during a particular time interval; and
generating an empty data set for the report based on the determining that there is no new data.

13. A non-transitory computer-readable device having instructions stored thereon that, when executed by at least one computing device, cause the at least one computing device to perform operations comprising:
retrieving data from a table of a database;
retrieving a schema of the table;

identifying a first offset corresponding to the retrieved data indicating a retrieval time of the retrieved data and a number of records corresponding to the retrieved data;

determining that the retrieved data corresponds to the schema;

storing the retrieved data on an intermediary messaging platform wherein the stored data and the schema are available to one or more end users prior to a transfer to one or more cloud servers;

determining a second offset corresponding to a number of records of the data retrieved by the one or more end users from the intermediary messaging platform;

validating that the second offset corresponds to the first offset;

transferring the records and the schema retrieved from the intermediary messaging platform to the one or more cloud servers for different data sets retrieved from the table of the database;

determining that at least one of the transferred records of one of the data sets includes an error;

based on the retrieval time of the first offset, identifying which data set corresponds to the error; and re-retrieving the identified data set identified based on the first offset, wherein at least one of the different data sets is not re-retrieved.

14. The device of claim 13, wherein the schema includes a table name, column names of a plurality of columns of the table, and data types for the plurality of columns of the table.

15. The device of claim 13, the operations further comprising:

repeating the retrieving, identifying, determining that the retrieved data corresponds to the schema, storing, determining the second offset, validating, and transferring a plurality of times for different sets of data retrieved from the table of the database and transferred to the one more cloud servers.

16. The device of claim 13, the operations further comprising:

identifying a plurality of sensitive data values retrieved from the table; and encrypting the sensitive data values, wherein the operations comprising storing the retrieved data further comprise storing the encrypted sensitive values on the intermediary messaging platform.

17. The device of claim 13, the operations further comprising storing both the first offset and the second offset in a log.

* * * * *